United States Patent [19]

Suzuki

[11] Patent Number: 4,477,976
[45] Date of Patent: Oct. 23, 1984

[54] CONTACT SENSOR

[75] Inventor: Sigeru Suzuki, Futtsu, Japan

[73] Assignee: Kuroda Precision Industries Ltd., Kawasaki, Japan

[21] Appl. No.: 566,700

[22] Filed: Dec. 29, 1983

[30] Foreign Application Priority Data

Dec. 29, 1982 [JP] Japan .................... 57-197243[U]

[51] Int. Cl.³ .................................... G01B 7/00
[52] U.S. Cl. ........................ 33/169 R; 33/172 E; 33/174 L
[58] Field of Search ............. 33/169 R, 172 E, 174 L, 33/169 C, 172 D

[56] References Cited

U.S. PATENT DOCUMENTS

| 4,153,998 | 5/1979 | McMurtry | 33/174 L |
| 4,155,171 | 5/1979 | McMurtry | 33/174 L |
| 4,279,080 | 7/1981 | Nakaya | 33/172 E |
| 4,443,946 | 4/1984 | McMurtry | 33/172 E |

FOREIGN PATENT DOCUMENTS

| 49-94370 | 9/1973 | Japan | 33/174 L |
| 794361 | 1/1981 | U.S.S.R. | 33/169 R |

Primary Examiner—Willis Little
Attorney, Agent, or Firm—Fleit, Jacobson, Cohn & Price

[57] ABSTRACT

A contact sensor for detecting operation of a movable probe against force added by an object from any direction. The contact sensor has a movable probe which is supported in a cylindrical housing, a bridge, and only one set of electric contacts which are provided at center of the movable probe and the bridge and pushed each other by a spring provided in the housing. The movable probe comprises a hollow connector, a stylus which fixed at one end of the connector and extended from an opening of a cylindrical housing, and a flange which is provided at the other end of the connector. The flange is freely mounted on an annular fulcrum fixed on an inner wall of the housing so that electric signals are detected by a detector when the movable probe freely inclines at the fulcrum and the electric contacts operate due to pushing the stylus with an object from any direction.

8 Claims, 3 Drawing Figures

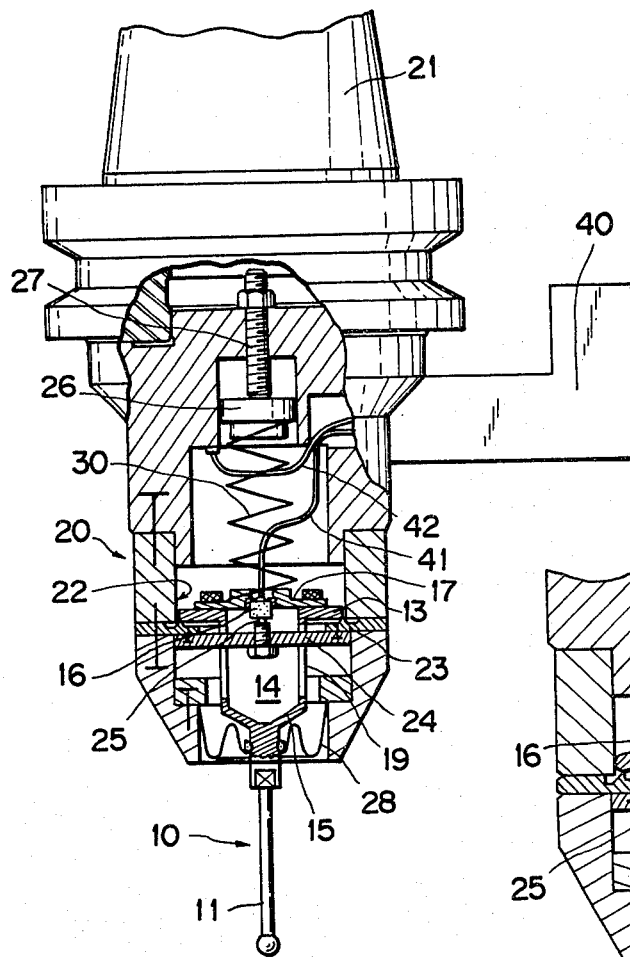
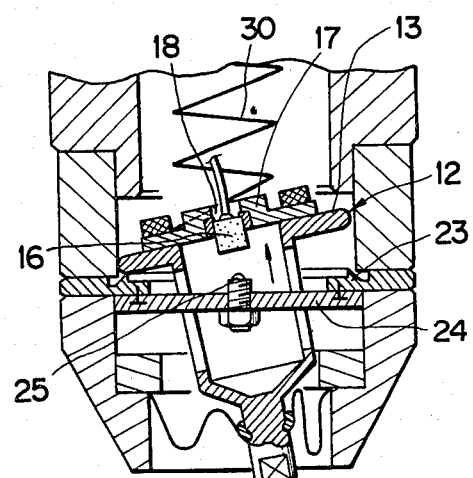
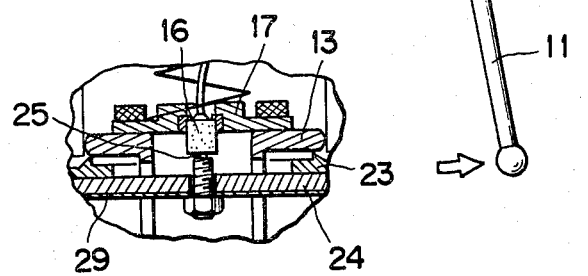

4,477,976

CONTACT SENSOR

DESCRIPTION

BACKGROUND OF THE INVENTION

This invention relates to a contact sensor, and particularly to the contact sensor which is fixed to an axle of a machine tool or an apparatus of measurement, which the sensor has one set of electric contacts provided axially on a bridge member and a movable probe.

A conventional contact sensor has three sets of electric contacts and one set of the contacts has two electric contacts comprised by two ball bearings and an arm member, and a probe is supported at three points on three pairs of the electric contacts by three arm members as shown in the Japanese patent application laid open No. 49-94370 (94370/74). Therefore, the conventional electric contacts are totally provided six electric contacts thereon, and has a fault that the reliance of the sensor is reduced. The three arms extended radially from the center of the top of the probe and each arm is supported on a V-shape groove of a pair of the ball bearing of the electric contacts. By these three points support of the probe, there is other fault that precision of repetition operation of the contact sensor differ due to direction of measurement of an object, therefore, when the object is measured, if the direction of the object is not decided, a value of the measurement is brought about a change. And insulating member as a insulating wall must be provided between each ball bearing as the electric contacts, and three arms must be radially provided to touch the ball bearings. Therefore, the structure of the conventional contact sensor is very complex and the cost for manufacturing the sensor is highly increased.

SUMMARY OF THE INVENTION

The present invention of a contact sensor has only one set of electric contacts which are provided at a center of a movable probe and a bridge member to operate freely and constantly by force from any direction of an object. And the movable probe comprises a hollow connector, a stylus which is fixed at one end of the connector and extended from the opening of a housing, and a flange which is provided at the other end of the connector, and the flange is freely mounted on an annular member which is fixed on an inner wall of the cylindrical housing.

Accordingly, a principal object of the present invention is to provide a contact sensor which overcome the above disadvantage by providing only one set of electric contacts and a movable probe which has an annular flange freely mounted on an annular fixed fulcrum member.

Another object of the present invention is to provide a contact sensor which has the aforesaid movable probe which has a stylus extended from an opening of a housing, and the fulcrum member whereby the movable probe operates freely due to force added from any direction by an object and detect the operation of the electric contacts.

Still another object of the present invention is to provide a contact sensor which has high stableness of operation of a movable probe against an object from any direction, and increases precision of repetition operation and reliance of an electric contact due to simple structure at low cost of manufacturing the contact sensor.

Other objects and many of the attendant advantages of this invention will be readily appreciated as the same become better understood by reference to the following description on basis of the attached drawings.

BRIEF DESCRIPTION OF THE DRAWINGS

The accompanying drawings illustrate the preferred embodiments of the present invention. In the drawings, the same reference numerals illustrate the same parts of the invention, in which:

FIG. 1 is a partially sectional view of a first embodiment of a contact sensor of the present invention, FIG. 2 is an enlarged sectional view of a main structure of FIG. 1, FIG. 3 is a sectional view of a partial structure of electric contacts and their supporting members of a second embodiment.

THE DETAILED DESCRIPTION OF THE INVENTION

With reference to FIG. 1, one of the preferred embodiments of a contact sensor is shown. The contact sensor is substantially comprised by a cylindrical housing 20, a movable probe 10, a first electric contact 16, a fulcrum member 23, a bridge member 24, a spring member 30 and a detector 40 of electric signals.

The movable probe 10 is comprised by a hollow connector 15, a stylus 11 which is fixed at one end of the connector 5, an annular flange 13 which is provided at the other end of the connector 15, a supporting member 17 which has a small hole 18 at a center portion and is horizontally fixed on the flange 13. The first electric contact 16 is fitted in the hole 18 of the supporting member 17 to extend therefrom. An outer side wall of the flange is curved.

The housing 20 has an opening at one end and a fitting portion 21 for a main axle of a machine tool or the like at the other end. The housing 20 forms a cylindrical portion 22 to receive the flange 13 of the movable probe 10. The fulcrum member 23 is annularly formed to have a spire in a cross sectional view on an annular base, and a diameter of the spire is slightly smaller than a diameter of the flange 13. The annular fulcrum member 23 is fixed within an inside surface of the cylindrical portion 22 of the housing 20 by an appropriate means.

The flange 13 of the movable probe 10 is freely mounted on the spire of the annular fulcrum member 23 and the stylus 11 extends through the opening of the housing 20.

The bridge member 24 is fixed on an undersurface of the fulcrum member 23 so that the bridge member 24 extends horizontally through openings 19, 19 provided at the side wall and hollow center portion 14 of the connector 15 of the movable probe 10. The second electric contact which is threaded metal screw is controllably set to a hole which is provided at a center portion of the bridge member 24. The second electric contact 25 is controlled the hight to position a tip of the contact 25 at slightly higher than a tip of the spire of the annular fulcrum member 23 so that both the electric contacts 16, 25 usually contact each other in unloading condition.

In the drawings, a numeral 26 shows a spring support which is movable supported in a hole of the housing. The spring support 26 controls pressure of measurement loaded to the stylus 11 by means of a threaded screw 27 which is rotatably provided at an end of the housing 20. A numeral 28 shows a sealing member such as a bellows type diaphragm which is fitted inside of the opening of the housing 20.

The first electric contact 16 and the second electric contact 25 are respectively electrically connected to a source of electricity. Numerals 41 and 42 show respectively lead wires. The lead wire 41 is connected to the first electric contact 16 from the source of electricity, and the other lead wire 42 is connected to an inside surface of the housing 20 from the sorce of the electricity electrically to charge to the second electric contact 25.

Opposite ends of the lead wires 41 and 42 are respectively connected to the detector 40 of electric signals.

As the detector, an electric wave type means, an induction type means, a photoelectricity type means or other means are available to the detector of the signals.

With regard to the shape of the annular fulcrum member 23, as other embodiment, a member of an arc shape in cross sectional view of the annular fulcrum member is available instead of the spire shape member thereof, or means of ball bearings provided in a annular groove of an annular base is available as the fulcrum member.

Operation of the contact sensor of the present invention is explained in accordance with FIG. 2. In a case that an object touches horizontally the stylus 11 and force is added on the stylus as shown by an arrow head, the movable probe moves and inclines toward, one portion of the undersurface of the flange 13 of the movable probe 10 pushes one portion of the tip of spire of the annular fulcrum which operates as a fulcrum, and simultaneously the movable probe moves and inclines toward as shown in a black arrow head in the drawings in opposition to force of the spring member 30. Subsequently, the first electric contact 16 separates from the second electric contact 25 and electrical conduction through both the contacts 16 and 25 is broken off. The electrical conduction and/or break of the electrical conduction are detected by the detector 40. A control apparatus (not shown in the drawings) of the machine tool is input through the detector 40.

In the first embodiment of the contact sensor of the present invention, the second electric contact 25 is controllably fixed to the bridge member 24. In FIG. 3, the other embodiment of the bridge member is shown and the bridge member 24 is supported by a flat spring 29. The flat spring 29 is fitted on the undersurface of the bridge member 24, and the second electric contact 25 is controllably supported to the flat spring 29. Therefore, the second electric contact 25 is able to move axially in limited range. By the force of the flat spring 29, the second electric contact 25 is pushed on the first electric contact 16.

Under the structure of the second embodiment, in an unloaded condition, the undersurface of the flange 13 of the movable probe 10 contacts on the annular fulcrum member 23 by force of the spring member 30. Therefore, contact between both the electric contacts 16 and 25 is stably kept, and the first electric contact 16, i.e. the movable probe is prevented from moving biasedly against the second electric contact 25, and the movable probe is moved in the same manner to any direction.

As explained above, the structure of the contact sensor of the present invention, only one point of electric contact is provided, therefore, accuracy and reliability of the electric contact are very high. And as the fulcrum member is annular, accuracy of repeated operation of the movable probe is stable, and a fault that the accuracy of repeated operation in each direction of measurement is different in each measurement in the conventional contact sensor is dissolved.

The present invention has excellent effects that the structure of the contact sensor of the present invention is very simple and is manufactured at a low cost.

Many prominent and excellent features of the present invention shall become manifest from the above description. The size of the elements is not limited and the size and shape thereof shall be changed and also considered in accordance with suitable requirements on design shall be included in the scope of the claims of the present invention.

We claim:

1. A contact sensor comprising:
   a housing having an opening,
   a movable probe having a hollow connector, a stylus fixed at one end of the connector and extended from the opening of the housing, and a flange provided at the other end of the connector with a supporting member,
   a first electric contact provided on a center of the supporting member of the flange,
   a fulcrum member provided inside of the housing freely to support the flange,
   a bridge member provided under the flange through the hollow portion of the connector,
   a second electric contact provided on a center of the bridge member to contact with the first electric contact,
   a spring member provided in the housing to press the flange against the fulcrum for positioning the flange at a stable position relative to the housing, and
   a detector provided on the housing to detect electric signals arisen due to separation and contact of both the electric contacts.

2. The contact sensor of claim 1 wherein the housing is cylindrical.

3. The contact sensor of claim 1 wherein one of the electric contact is pressed against the other electric contact by the spring member.

4. The contact sensor of claim 1 wherein the flange is cylindrical, and the circumferential outer side wall of the flange is curved.

5. The contact sensor of claim 1, further comprising a threaded screw rotatably fitted with an end in the housing controllably to support the spring member.

6. The contact sensor of claim 1, further comprising a sealing member fixed with a wall of the opening of the housing to seal the opening and the movable probe extending through the sealing member.

7. The contact sensor of claim 1 wherein the electric contacts connect with a source of electricity.

8. The contact sensor of claim 1 wherein the bridge member is supported by a spring member to be movable the second electric contact along an axis of the electric contacts.

* * * * *